UNITED STATES PATENT OFFICE.

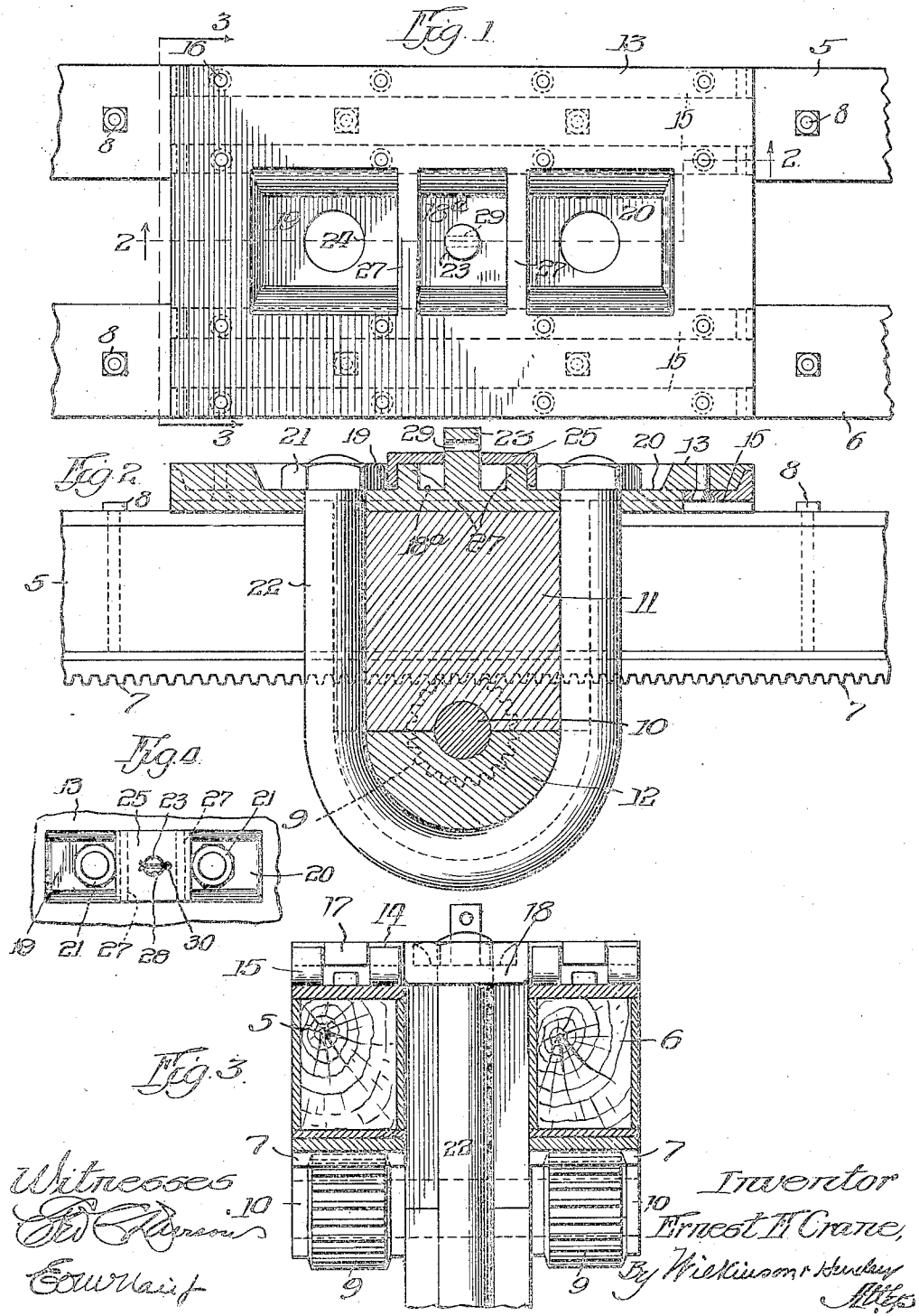

ERNEST E. CRANE, OF MINNEAPOLIS, MINNESOTA, ASSIGNOR TO AMERICAN MANGANESE STEEL COMPANY, OF CHICAGO, ILLINOIS, A CORPORATION OF MAINE.

SADDLE BLOCK-PLATE.

1,359,335.   Specification of Letters Patent.   Patented Nov. 16, 1920.

Application filed December 18, 1918. Serial No. 267,398.

*To all whom it may concern:*

Be it known that I, ERNEST E. CRANE, a citizen of the United States, residing at Minneapolis, in the county of Hennepin and State of Minnesota, have invented certain new and useful Improvements in Saddle Block-Plates, of which the following is a specification.

My invention relates to steam shovels and the like and particularly to a novel runner or slide used on the rack beams of shovels and similar tools.

In the operation of rack beams on steam shovels and the like, longitudinal movement of the beam is brought about by a rack and pinion construction whereby on rotation of the pinion the rack is moved in either direction as desired. For maintaining the pinion in operative engagement with the rack, a runner is provided which engages the top portion of the rack beam and supports the pinion shaft in engagement with the rack, usually on the bottom of the beam. My invention is directed to the runner and especially to a separate saddle plate for engaging the top portion of the rack and provided with means for supporting the remainder of the runner to maintain the pinion in proper engagement with the rack.

One of the objects of my invention is to provide renewable runners on saddle plates for rack beams.

Another object is to provide a renewable runner for saddle plates for rack beams to maintain proper engagement between the pinion and the rack and which runner may be renewed when worn without discarding the whole plate.

A further object is to reduce the initial cost and the cost of upkeep of plates for rack beams and to improve the same for successful commercial use.

Generally speaking I accomplish the objects of my invention by forming a saddle plate of cast metal having a depressed central portion for receiving the ends of a U-bolt which supports the saddle block and gears and provides on the under sides of the plate means for supporting rider strips or runners which serve as friction reducing bearings for engagement with the top of the rack beam and which hold the saddle plate in such position as to permit it to slide over the tops of the bolts extending through the upper part of the rack beam.

These and other objects will be apparent from the drawings wherein—

Figure 1 is a top plan view of the preferred embodiment of my invention.

Fig. 2 is a longitudinal vertical section on line 2—2 of Fig. 1.

Fig. 3 is a vertical section on line 3—3 of Fig. 1, and

Fig. 4 is a plan view of a lock for the nuts on the U-bolt.

5 designates one leg of a rack beam and 6 the other. These are maintained in parallel relation as is well understood and suitably connected to the shovel or the like for operation. The bottom portions of the members 5 and 6 are provided for a suitable portion of their length with racks 7 secured thereto by means of bolts 8 or other suitable attaching means. For coöperative engagement with the rack 7, pinions 9 are provided mounted on a shaft 10 which is suitably connected by means not shown to the motive power for reciprocating the rack beams. In the construction shown the shaft 10 is supported by a central filler member 11 alined between the insides of the rack beams 5 and 6, and having a recessed portion adapted to serve as an upper bearing for the shaft 10. A separable bearing member 12 supports the shaft from below and has faces engaging the lower edges of the member 11, as shown in Fig. 2. For supporting the runner on the rack beams a top saddle plate 13 is provided. Usually in constructions of this sort the whole runner is formed of a single casting so that when the top or rider portion becomes worn thus permitting play between the pinion and rack, it is necessary to discard the whole runner casting or saddle plate supplying a new one in its place which is a very costly renewal. As a slide member for the runner of my invention, I provide a separable saddle plate 13 having on its under side recessed portions 14 for receiving rider strips 15. These strips may be of the same metal of which the saddle plate is made or may be preferably of anti-friction metal so as to reduce the friction between the rider plate and the rack beams. These rider strips 15 are secured in the saddle plate 13 by means of bolts or screws 16. A portion 17 of the saddle plate between the recesses 14 is downwardly extending as means for affording strength to the plate. The central portion of the plate is depressed at 18 forming recesses 19 and 20 which recesses are of a sufficient depth to receive the nuts 21 on the ends of the U-bolt 22 so as to permit the top of the saddle plate to be clear of any projections.

To provide means for preventing loosening of the nuts 21 I employ a member 25 as shown in Fig. 4. Member 25 has downwardly extending end portions 26 in thickness sufficient to lie between the division walls 27 and the adjacent portions of the nuts 21. To secure the member 25 in position, an aperture 28 is provided through which extends the pin 23. Pin 23 is provided with a slot 29 with which a cotter pin 30 is engaged to prevent the member 25 from being displaced.

The runner of my invention is assembled from the bottom upwardly, the shaft and pinions being put into position with respect to the rack the upper member 11 being inserted and then the saddle plate with the rider strips applied is put on top of the rack beams and the U-bolt 22 which surrounds the lower bearing member 12 is passed through the apertures 24 in the depressed portions 18 of the saddle plate, then the nuts 21 are applied and screwed home until the whole runner is brought properly together and the pinion in proper operating engagement with the rack bars. It will thus be observed that by my invention I have provided a runner for rack beams wherein any of the parts when worn may be readily replaced by other parts without having to discard the entire runner structure. I prefer to make the saddle plate of alloy steel such as manganese steel in order to prolong the life thereof and to provide a casting which is strong and which is suitable for very rough usage.

I do not wish to limit my invention to the exact arrangement shown and described as I am aware that modifications thereof may be made and such modifications I consider as coming within the scope of my invention.

I claim:—

1. In combination a rack, a shaft, pinions thereon, a saddle plate, and a U-bolt, the bolt having engagement with the plate for supporting the pinions in engagement with the rack.

2. In combination a rack beam, a saddle plate for sliding on the beam, a rack on the beam, a pinion for engaging said rack, a U-bolt underlying the pinion and having its ends extending through the plate, and means for adjustably securing said bolt in said plate.

3. In combination a rack, a saddle plate, a shaft, a pinion on said shaft for engaging the rack, a filler between the plate and the shaft, a bearing underlying the shaft, and a U-bolt for supporting said bearing and said shaft against the filler, said bolt being adjustably supported by said plate.

4. In combination a rack beam, a saddle plate provided with rider strips for sliding on the beam, a rack on the beam, a pinion for engaging said rack, a U-bolt underlying the pinion and having its ends extending through the plate, and means for adjustably securing said bolt in said plate.

5. A saddle plate for rack beams including a plate adapted to ride on the upper side of the beam, and rider strips removably secured to the under side of said plate for sliding on the beam and for spacing the plate from the beam.

6. In combination, a rack beam, a shaft, a pinion thereon, a separate plate having anti-friction members thereon for sliding with respect to said beam, means adjustably supported by said plate for maintaining said pinion in operative engagement with the rack, and means for maintaining said supporting means in adjusted position.

7. In combination, a rack beam, a shaft, a pinion for coöperating therewith, and means for maintaining said pinion in operative engagement with said rack, said means including a U-bolt depending from said plate and supporting said shaft, nuts for adjusting the bolt in the plate and means removably retained on said plate for preventing loosening of the nuts.

8. In combination, a rack beam including a pair of spaced paralled members, each member having a rack on its under side, a shaft, pinions on said shaft for engaging said racks, a saddle plate adapted to ride on the top of said members, and means depending from said plate between said members for supporting said shaft and retaining it in engagement with the racks.

9. A saddle plate for rack beams including a single member adapted to overlie the beams and having longitudinal grooves formed in its under side, anti-friction members removably secured in said grooves and adapted to have sliding contact with the beams, the surface contacted by the anti-friction members being less than the full width of the beam.

10. A saddle plate for rack beams comprising a single casting provided with recesses in its under side, anti-friction members in said recesses for contacting the beam, said members being arranged to contact the beam near the outer edges thereof and thereby maintain said plate above the surface of the beam.

Signed at Minneapolis, Minn., this 2nd day of December, 1918.

ERNEST E. CRANE.